(12) United States Patent
Asakura et al.

(10) Patent No.: US 7,681,212 B2
(45) Date of Patent: Mar. 16, 2010

(54) PHOTOSENSITIVE RECORDING MEDIUM CARTRIDGE

(75) Inventors: Katsuyoshi Asakura, Kanagawa (JP); Tomoyuki Takahashi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 799 days.

(21) Appl. No.: 11/505,925

(22) Filed: Aug. 18, 2006

(65) Prior Publication Data

US 2007/0044117 A1 Feb. 22, 2007

(30) Foreign Application Priority Data

Aug. 19, 2005 (JP) .................. P. 2005-238706

(51) Int. Cl.
*G11B 23/03* (2006.01)
(52) U.S. Cl. .................. 720/739; 720/728; 720/744
(58) Field of Classification Search ......... 720/725–744; 360/133
See application file for complete search history.

(56) References Cited

U.S. PATENT DOCUMENTS

| | | | | |
|---|---|---|---|---|
| 5,726,971 A * | 3/1998 | Wanger et al. | ............. | 720/726 |
| 5,850,384 A * | 12/1998 | Ohmori et al. | ............. | 720/739 |
| 6,477,137 B1 * | 11/2002 | Takahashi | ................... | 720/744 |
| 6,831,813 B2 * | 12/2004 | Takizawa et al. | ........... | 360/133 |
| 6,885,521 B2 * | 4/2005 | Kikuchi | ....................... | 360/133 |
| 7,086,074 B2 * | 8/2006 | Oishi | ......................... | 720/740 |
| 7,487,521 B2 * | 2/2009 | Kawasaki et al. | ........... | 720/718 |
| 7,506,348 B2 * | 3/2009 | Ohgi | ......................... | 720/744 |
| 7,512,961 B2 * | 3/2009 | Ohgi | ......................... | 720/738 |
| 2002/0006107 A1 * | 1/2002 | Kikuchi | ...................... | 369/291 |
| 2002/0122380 A1 * | 9/2002 | Hashimoto | .................. | 369/291 |
| 2003/0031118 A1 * | 2/2003 | Shiomi et al. | ................ | 369/291 |
| 2003/0039202 A1 * | 2/2003 | Oishi | ........................ | 369/291 |
| 2003/0198177 A1 | 10/2003 | Horimai et al. | | |
| 2006/0143642 A1 * | 6/2006 | Kawasaki et al. | ........... | 720/738 |

FOREIGN PATENT DOCUMENTS

| | | | | |
|---|---|---|---|---|
| JP | 62143273 A | * | 6/1987 | |
| JP | 06-020427 | | 1/1994 | |
| JP | 06-067348 | | 3/1994 | |
| JP | 10106210 A | * | 4/1998 | |
| JP | 10125035 A | * | 5/1998 | |

(Continued)

OTHER PUBLICATIONS

English-machine translation of JP 2002-288961 A to Fujimaki, published on Oct. 4, 2002.*

*Primary Examiner*—William J Klimowicz
(74) *Attorney, Agent, or Firm*—Sughrue Mion, PLLC

(57) ABSTRACT

A photosensitive recording medium cartridge comprising a cartridge body, an opening, and a shutter, the cartridge body receiving a disc type photosensitive recording medium therein so that the photosensitive recording medium can rotate, the opening being provided in the cartridge body for exposing the photosensitive recording medium to an outside, the shutter being attached to the cartridge body so that the shutter can move between a close position for closing the opening and an open position for opening the opening, wherein: the shutter includes a bent portion which is formed in an outer circumferential end portion of the shutter so as to be bent toward the cartridge body side; and the cartridge body includes a protrusion portion which is formed in a position corresponding to the outer circumferential end portion.

14 Claims, 14 Drawing Sheets

FOREIGN PATENT DOCUMENTS

| JP | 10312663 | | | 11/1998 |
| JP | 2002288961 | A | * | 10/2002 |
| JP | 2003-317422 | A | | 11/2003 |
| JP | 2003338154 | A | * | 11/2003 |
| JP | 2004-005877 | | | 1/2004 |
| JP | 2004-029476 | A | | 1/2004 |
| JP | 2004265511 | A | * | 9/2004 |
| JP | 2005190638 | A | * | 7/2005 |

* cited by examiner

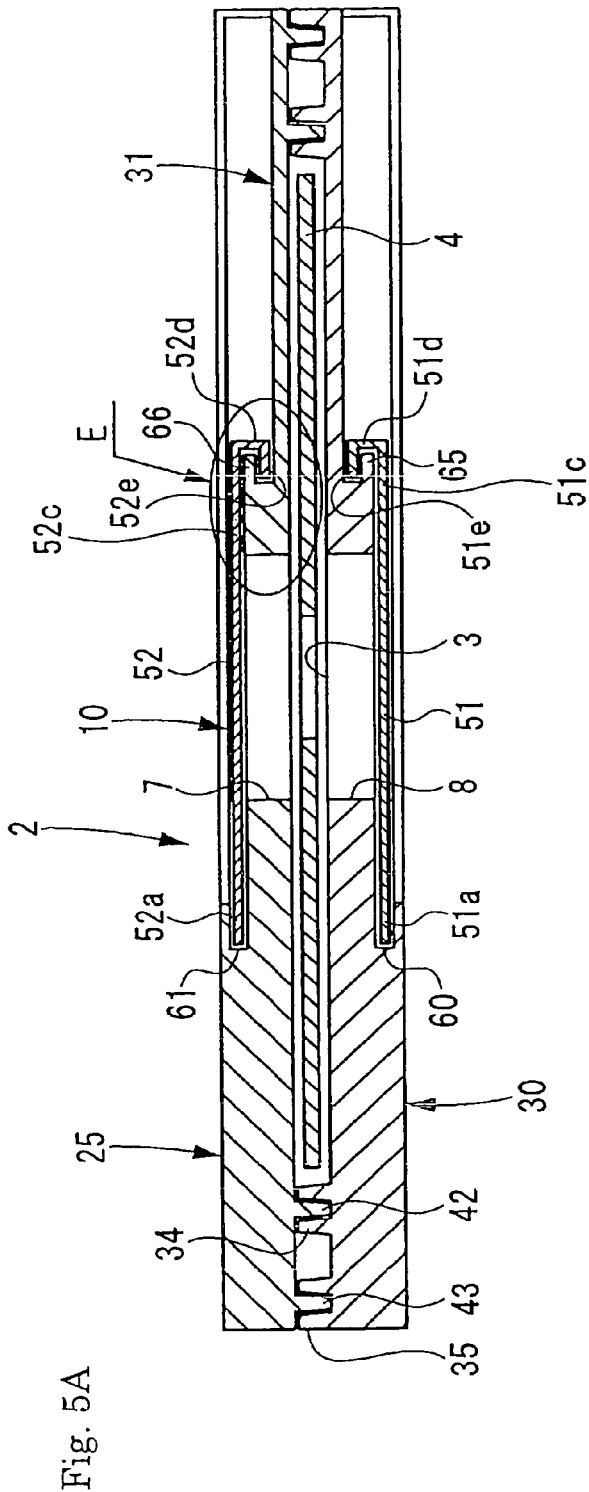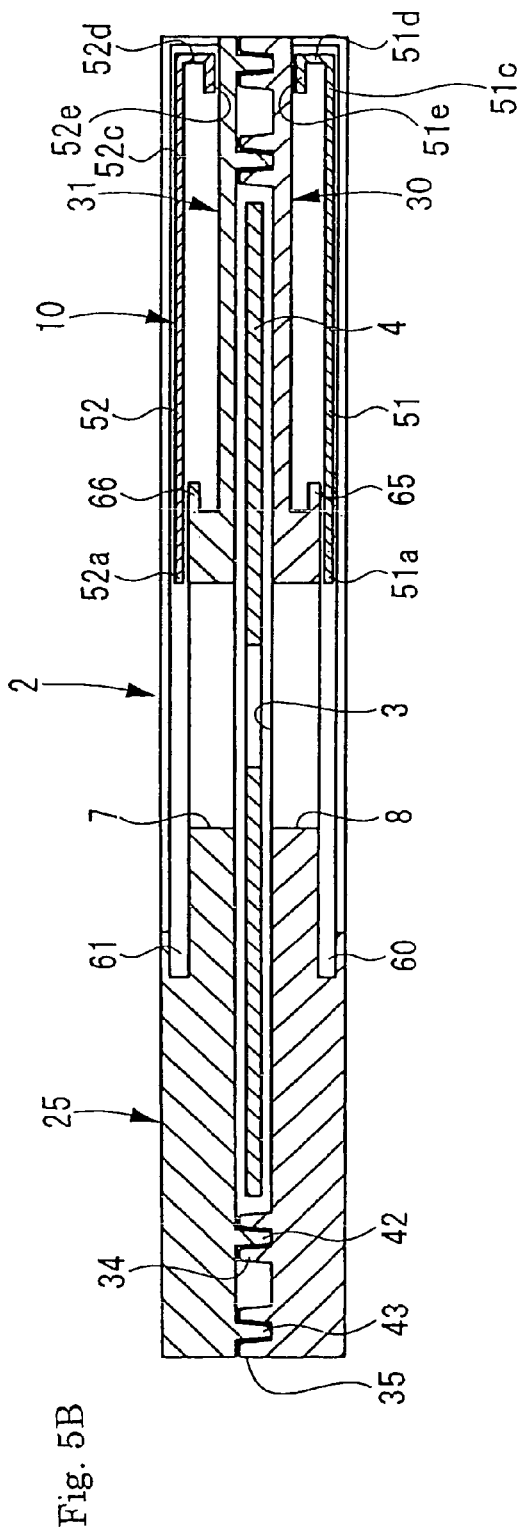

US 7,681,212 B2

PHOTOSENSITIVE RECORDING MEDIUM CARTRIDGE

FIELD OF THE INVENTION

The present invention relates to a photosensitive recording medium cartridge for receiving a photosensitive recording medium and particularly relates to an improvement in light-shielding performance and dustproof performance between a cartridge body of a photosensitive recording medium cartridge for receiving a holographic recording medium as a photosensitive recording medium and a shutter.

BACKGROUND OF THE INVENTION

A holographic recording medium on which data are recorded holographically has been invented (e.g. see JP-A-2004-029476). The holographic recording medium is a photosensitive recording medium in which holographic recording layers each made of photosensitive material are provided on a disc-shaped support. Data are multiplexedly recorded as interference fringes of laser light, so that a larger data recording capacity than that of a DVD which is a recording medium heretofore widespread can be obtained. Exposure of the holographic recording layers to light or deposition of dust on the holographic recording layers exerts a bad influence on the performance of the holographic recording medium. For this reason, the holographic recording medium is dealt with in the condition that the holographic recording medium is stored in a cartridge having a light-shielding function and a dustproof function (e.g. see JP-A-2003-317422 (corresponding to US 2003/0198177 A1)).

In the invention described in JP-A-2004-029476, the holographic recording medium is stored in a cartridge similar to the cartridge of a DVD-RAM. The cartridge is made of a material low in transmittance of light rays in a wavelength range exerting influence on the holographic recording layers. On the other hand, in the invention described in JP-A-2003-317422 (corresponding to US 2003/0198177 A1), a cartridge is made of a material capable of blocking light with a color sensitive to the holographic recording layers, and a sponge-like light-shield material is stuck to a mating portion of a movable portion for exposing the holographic recording medium to the outside.

SUMMARY OF THE INVENTION

It is generally conceived that a cartridge for storing a disc-shaped recording medium includes: a pair of upper and lower shells for storing a recording medium while putting the recording medium between the upper and lower shells in the condition that the recording medium is rotatable; openings formed on the upper and lower shells to expose part of the recording medium to the outside; and a shutter for opening/closing the openings. A substantially slight gas is however formed between the shutter and each of the upper and lower shells because the cartridge is formed so that the shutter can open/close the openings. There is a possibility that light or duct entering the cartridge through the gap will exert a bad influence on the holographic recording medium.

The present invention is accomplished on consideration of such circumstances. An object of the invention is to provide a cartridge highly effective in light-shielding and dustproof of a photosensitive recording medium such as a holographic recording medium.

The foregoing object of the invention is achieved by a photosensitive recording medium cartridge including a cartridge body, an opening, and a shutter, the cartridge body receiving a disc type photosensitive recording medium therein so that the photosensitive recording medium can rotate, the opening being provided in the cartridge body for exposing the photosensitive recording medium to the outside, the shutter being attached to the cartridge body so that the shutter can move between a close position for closing the opening and an open position for opening the opening, wherein: the shutter includes a bent portion which is formed in an outer circumferential end portion of the shutter so as to be bent toward the cartridge body side; and the cartridge body includes a protrusion portion which is formed in a position corresponding to the outer circumferential end portion.

In the cartridge according to the invention, in a state where the openings of the cartridge body are closed with the shutter, there is provided a structure in which the gap between the bent portion of the shutter and the protrusion portion of the cartridge body goes round by the cartridge body side, that is, a so-called labyrinth structure. As a result, light or dust is prevented from entering the photosensitive recording medium in the cartridge through the gap between the shutter and each of the upper ad lower shells. Accordingly, the photosensitive recording medium can be prevented from being exposed to light, so that the photosensitive recording medium can be stored in a clean state.

Preferably, in the cartridge, the bent portion is formed in an end portion on a side of the outer circumferential end portion which can move in a direction of opening the shutter.

Preferably, in the cartridge, the shutter includes a first light-shield plate portion slidably moving so as to open/close the opening, a second light-shield plate portion provided vertically at an end on a side of the first light-shield plate portion which can move in a direction of opening the shutter, and a third light-shield plate portion provided vertically in a direction of closing the shutter with respect to the second light-shield plate portion; and the cartridge body includes a protrusive line which is inserted between the first light-shield plate portion and the third light-shield plate portion when the shutter is in the close position. In this manner, in a state where the openings of the cartridge body are closed with the shutter, the gap between the shutter and the cartridge body is folded four times. As a result, light incident in parallel with the shutter-opening/closing direction can be prevented from entering the photosensitive recording medium in the cartridge through the gap between the shutter and each of the upper and lower shells. Dust can be likewise prevented from entering the photosensitive recording medium. Accordingly, the photosensitive recording medium can be prevented from being exposed to light, so that the photosensitive recording medium can be stored in a clean state.

Preferably, in the cartridge, the shutter includes a first light-shield plate portion slidably moving so as to open/close the opening, and a second light-shield plate portion provided vertically at an end on a side of the first light-shield plate portion which can move in a direction of opening the shutter; and the protrusion portion includes a protrusion portion upper surface which is formed so as to face the first light-shield plate portion when the shutter is in the close position, and a protrusion portion side surface which is formed so as to face the second light-shield plate portion when the shutter is in the close position. In this manner, in a state where the openings of the cartridge body are closed with the shutter, the gap between the shutter and the cartridge body is folded twice. As a result, light incident in parallel with the shutter-opening/closing direction can be prevented from entering the photosensitive recording medium in the cartridge through the gap between the shutter and each of the upper and lower shells. Dust can be likewise prevented from entering the photosensitive recording medium. Accordingly, the photosensitive recording medium can be prevented from being exposed to light, so that the photosensitive recording medium can be stored in a clean state.

Preferably, in the cartridge, the shutter includes a first light-shield plate portion slidably moving so as to open/close the opening, a second light-shield plate portion provided vertically at an end on a side of the first light-shield plate portion which can move in a direction of opening the shutter, and a third light-shield plate portion provided vertically with respect to the second light-shield plate portion in a direction of opening the shutter; and the cartridge body includes a protrusion portion upper surface formed so as to face the first light-shield plate portion when the shutter is in the close position, a protrusion portion side surface formed so as to face the second light-shield plate portion when the shutter is in the close position, and a shutter slide surface offset in the inside of the protrusion portion upper surface and formed so as to face the third light-shield plate portion when the shutter is in the close position. In this manner, in a state where the openings of the cartridge body are closed with the shutter, the gap between the shutter and the cartridge body is folded twice. As a result, light incident in parallel with the shutter-opening/closing direction can be prevented from entering the photosensitive recording medium in the cartridge through the gap between the shutter and each of the upper and lower shells. Dust can be likewise prevented from entering the photosensitive recording medium. Accordingly, the photosensitive recording medium can be prevented from being exposed to light, so that the photosensitive recording medium can be stored in a clean state.

Preferably, the cartridge body is formed so that an inner surface of the cartridge body to the photosensitive recording medium and an outer surface of the cartridge body to the shutter are matted or embossed with a surface roughness Ra of 5 to 20 μm. In this manner, light can be diffused and attenuated by the rough surface even in the case where light enters the inside of the cartridge and between the cartridge body and the shutter. Accordingly, the bad influence on the photosensitive recording medium can be reduced.

Preferably, the cartridge body includes a first shell shaped like a plate, and a second shell lap-welded with the first shell, the first and second shells being made of one and the same thermo plastic or similar thermo plastics, the other components inclusive of the shutter being made of materials different from the materials of the first and second shells. In this manner, when the first and second shells are welded to each other, the first and second shells can be prevented from being welded to other components.

Preferably, in the cartridge, 0.01% by weight to 5.00% by weight of a light-shield substance are added to a plastic used for molding each of the first and second shells and the shutter. Preferably, when carbon black is used for a plastic used for molding the first and second shells and the shutter, 0.01% by weight to 2.00% by weight of carbon black are added to the plastic. In this manner, light transmittance of the cartridge body and the shutter can be reduced, so that light-shielding performance of the cartridge can be improved.

Preferably, in the cartridge, 0.1% by weight to 5.0% by weight of a silicone-based lubricant are added to a plastic used for molding each of the first and second shells and the shutter. In this manner, the operation of the shutter is smoothened. Accordingly, chips or the like can be prevented from being generated due to friction between the shutter and the cartridge body.

According to the invention, there can be provided a cartridge highly effective in light-shielding and dustproof of a photosensitive recording medium such as a holographic recording medium.

BRIEF DESCRIPTION OF THE DRAWINGS

FIGS. 5A and 5B are sectional views of the cartridge in a direction perpendicular to the mounting direction.

DETAILED DESCRIPTION OF THE INVENTION

Figure 1:
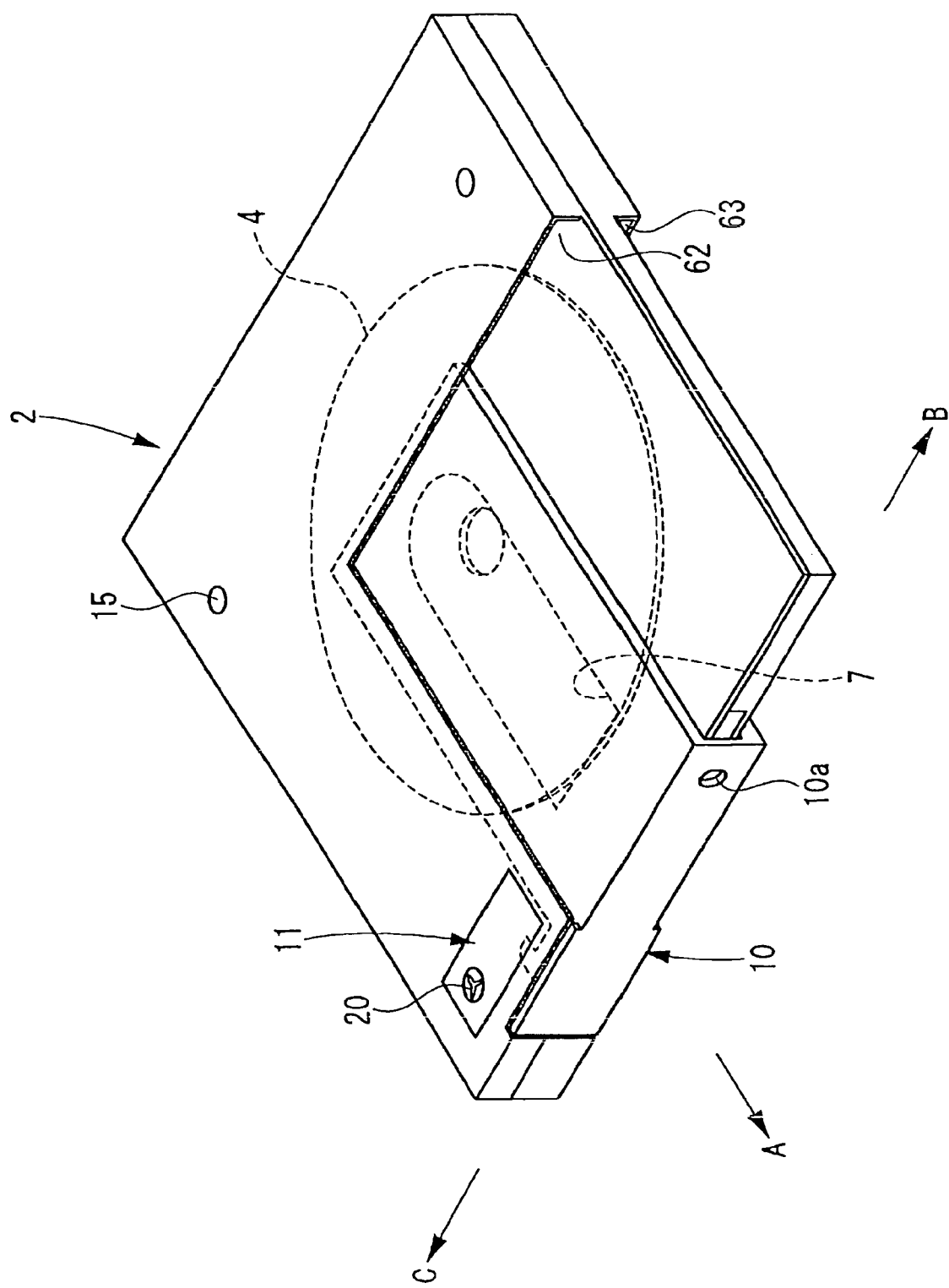
FIG. 1 is a perspective view showing external appearance of a cartridge according to a first embodiment.
Figure 2:
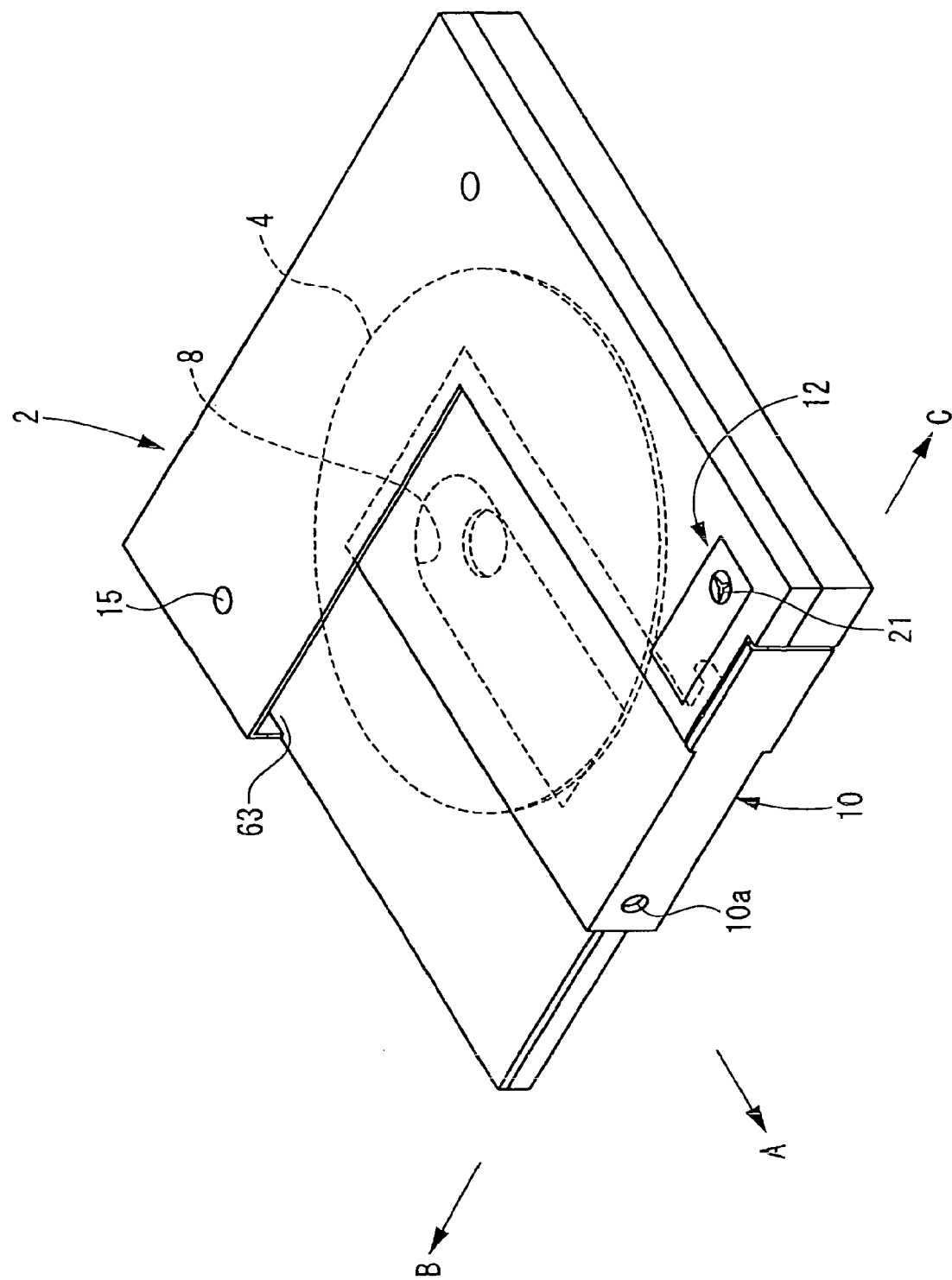
FIG. 2 is a perspective view showing the shape of external appearance on the rear surface side of the cartridge.
Figure 3:
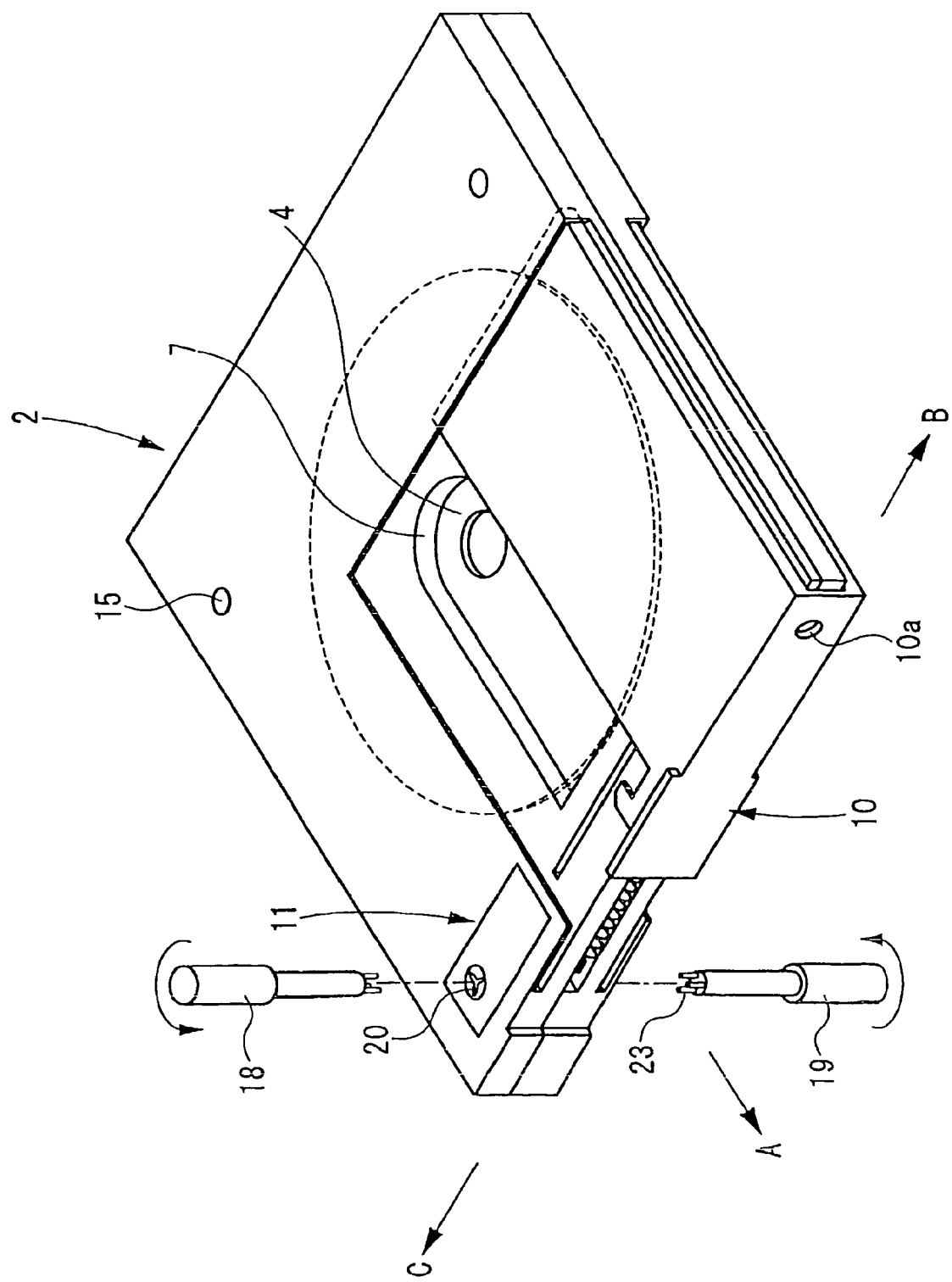
FIG. 3 is a perspective view of external appearance showing an open state of a shutter of the cartridge.
Figure 4:
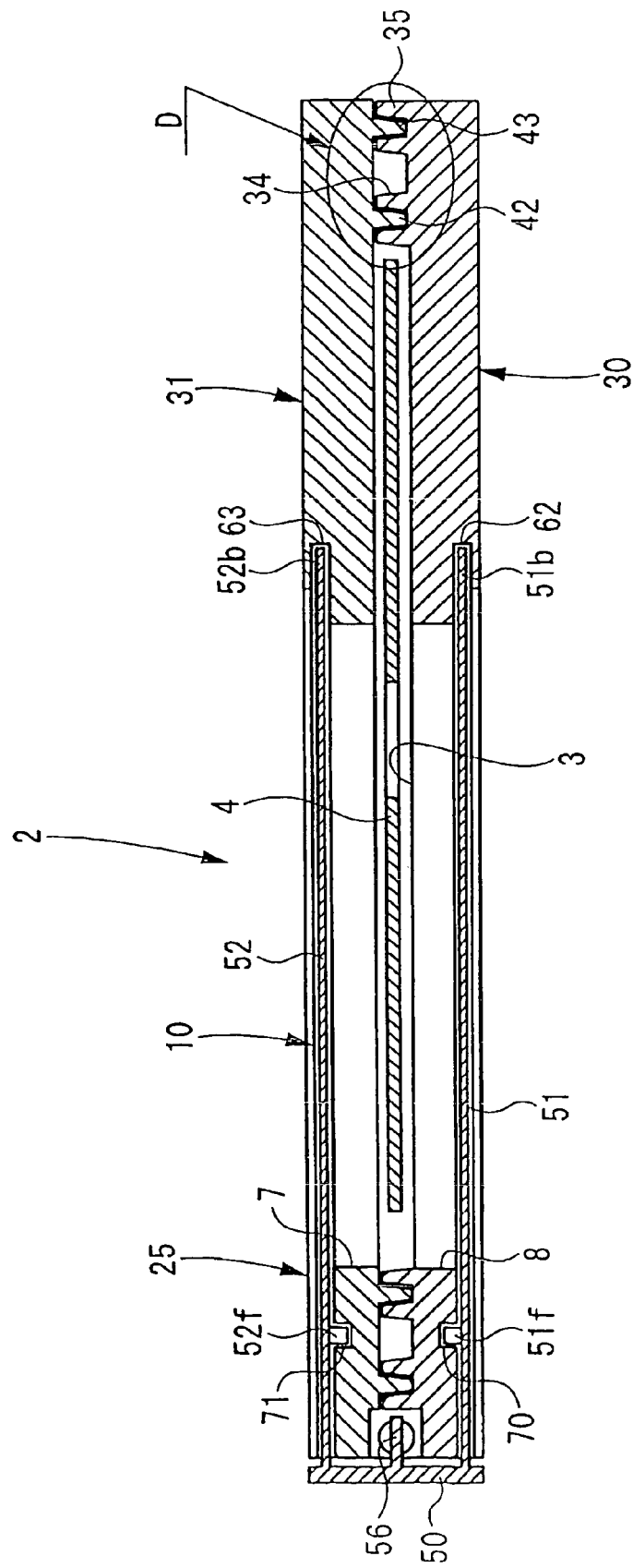
FIG. 4 is a sectional view of the cartridge in the mounting direction.

A first embodiment of a holographic recording medium cartridge (hereinafter referred to as "cartridge" simply) using the present invention will be described below in detail with reference to the drawings. FIGS. 1 to 3 are perspective views showing the external appearance of the cartridge according to the first embodiment. FIG. 4 and FIGS. 5A and 5B are sectional views of important part in a direction perpendicular to a cartridge mounting direction A.

The cartridge 2 is formed so that a disc-shaped holographic recording medium (hereinafter referred to as "recording disc") 4 is rotatably stored in a disc storage portion 3 provided in the inside of the cartridge 2. The recording disc 4 is dealt with in the condition that the recording disc 4 is stored in the cartridge 2.

The recording disc 4 is a photosensitive recording medium which is shaped like a disc with a hole formed in its central portion and which has holographic recording layers on its opposite surfaces. Each of the holographic recording layers is made of a photosensitive material. For example, laser light in a wavelength range of from green 532 nm to blue 405 nm permits data to be multiplexedly recorded as interference fringes of the laser light into the holographic recording layers.

Incidentally, a reinforcing material may be added to the hole portion of the recording disc 4.

Openings 7 and 8 for exposing the recording disc 4 stored in the disc storage portion 3 to the outside are formed in upper and lower surfaces of the cartridge 2. In an ordinary state, the openings 7 and 8 are closed with a shutter 10 which is movably provided on the outside of the cartridge 2. When the shutter 10 is moved toward an open position in a direction of the arrow B, the openings 7 and 8 are opened. The shutter 10 is urged toward a close position in a direction of the arrow C by a spring. The shutter 10 is locked in the close position by lock mechanisms 11 and 12 which are provided in opposite surfaces of the cartridge 2 so that the lock mechanisms 11 and 12 can operate independently. Accordingly, the shutter 10 is prevented from being moved by vibration, impact, etc. on the cartridge 2, so that the openings 7 and 8 are prevented from being opened carelessly.

A cartridge slot is provided in a recording apparatus for recording data in the recording disc 4 or provided in a reproducing apparatus for reading data from the recording disc 4. The cartridge 2 is inserted into the cartridge slot in a mounting direction A. The cartridge 2 inserted in the recording or reproducing apparatus is positioned by alignment holes 15 provided at opposite ends. The shutter 10 is moved to the open position to thereby open the openings 7 and 8. When, for example, the cartridge 2 is inserted in the apparatus in a state shown in FIG. 1, a pickup portion of the apparatus is inserted into the cartridge 2 through the opening 8 disposed in the lower surface so that data can be recorded in or reproduced from the holographic recording layer in the lower surface of the recording disc 4. On the other hand, when the cartridge 2 is inverted and inserted in the apparatus as shown in FIG. 2, the pickup portion is inserted into the cartridge 2 through the opening 7 disposed in the lower surface so that data can be recorded in or reproduced from the holographic recording layer in the upper surface of the recording disc 4 in FIG. 1.

Unlock mechanisms and a shutter opening/closing mechanism are incorporated in the recording or reproducing apparatus. The unlock mechanisms release the lock based on the lock mechanisms 11 and 12 of the cartridge 2. The shutter opening/closing mechanism moves the shutter 10 between the close position and the open position. As shown in FIG. 3, the unlock mechanisms move unlock jigs 18 and 19 axially in the apparatus so that the jigs 18 and 19 are engaged with unlock engagement portions 20 and 21 of the lock mechanisms 11 and 12 provided in opposite surfaces of the cartridge 2 respectively. For example, each of the unlock engagement portions 20 and 21 is shaped like a trident. Each of the unlock jigs 18 and 19 has three engagement pins 23 so that the unlock jig can easily engage with corresponding one of the unlock engagement portions 20 and 21.

When the unlock jigs 18 and 19 engaged with the unlock engagement portions 20 and 21 are rotated counterclockwise, the lock based on the lock mechanisms 11 and 12 is released. Then, with respect to the shutter opening/closing mechanism, a drive pin is inserted into a hole 10a and moved in an opening direction B. The hole 10a is formed in a side surface of the shutter 10. As a result, the shutter 10 is slidably moved, so that the openings 7 and 8 in the opposite surfaces of the cartridge 2 are opened as shown in FIG. 5B.

Figure 6:
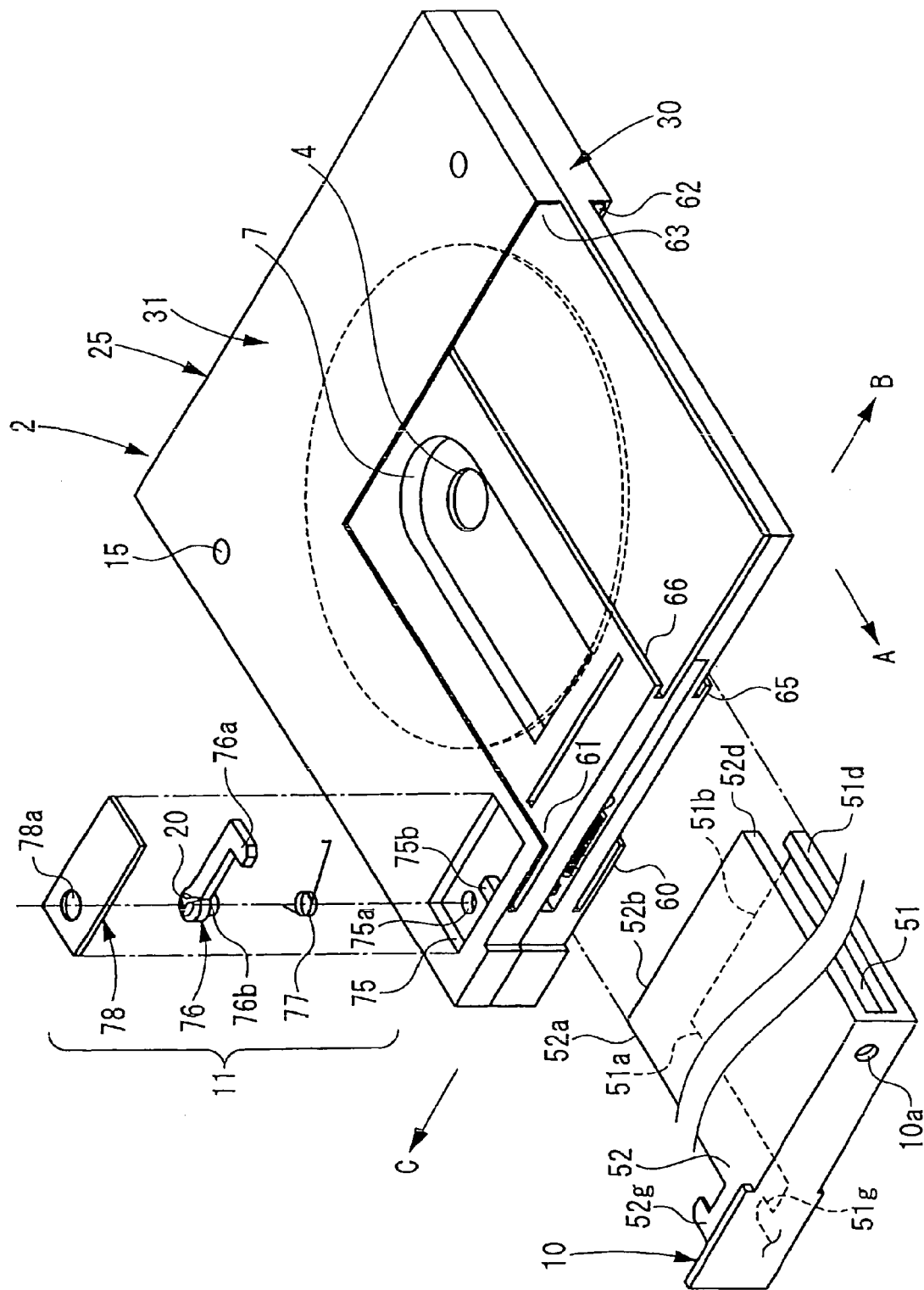
FIG. 6 is an exploded perspective view showing the configuration of the cartridge.

FIG. 6 is an exploded perspective view showing the configuration of the cartridge 2. The cartridge 2 includes a cartridge body 25, a shutter 10, and lock mechanisms 11 and 12. A recording disc 4 is rotatably stored in the cartridge body 25. Openings 7 and 8 in opposite surfaces of the cartridge body 25 are opened/closed from the outside by the shutter 10. The lock mechanisms 11 and 12 are incorporated in the cartridge body 25. Incidentally, detailed illustration and description of the lock mechanism 12 will be omitted because the lock mechanism 12 is plane-symmetric with the lock mechanism 11 and has the same construction and structure as those of the lock mechanism 11.

Figure 7:
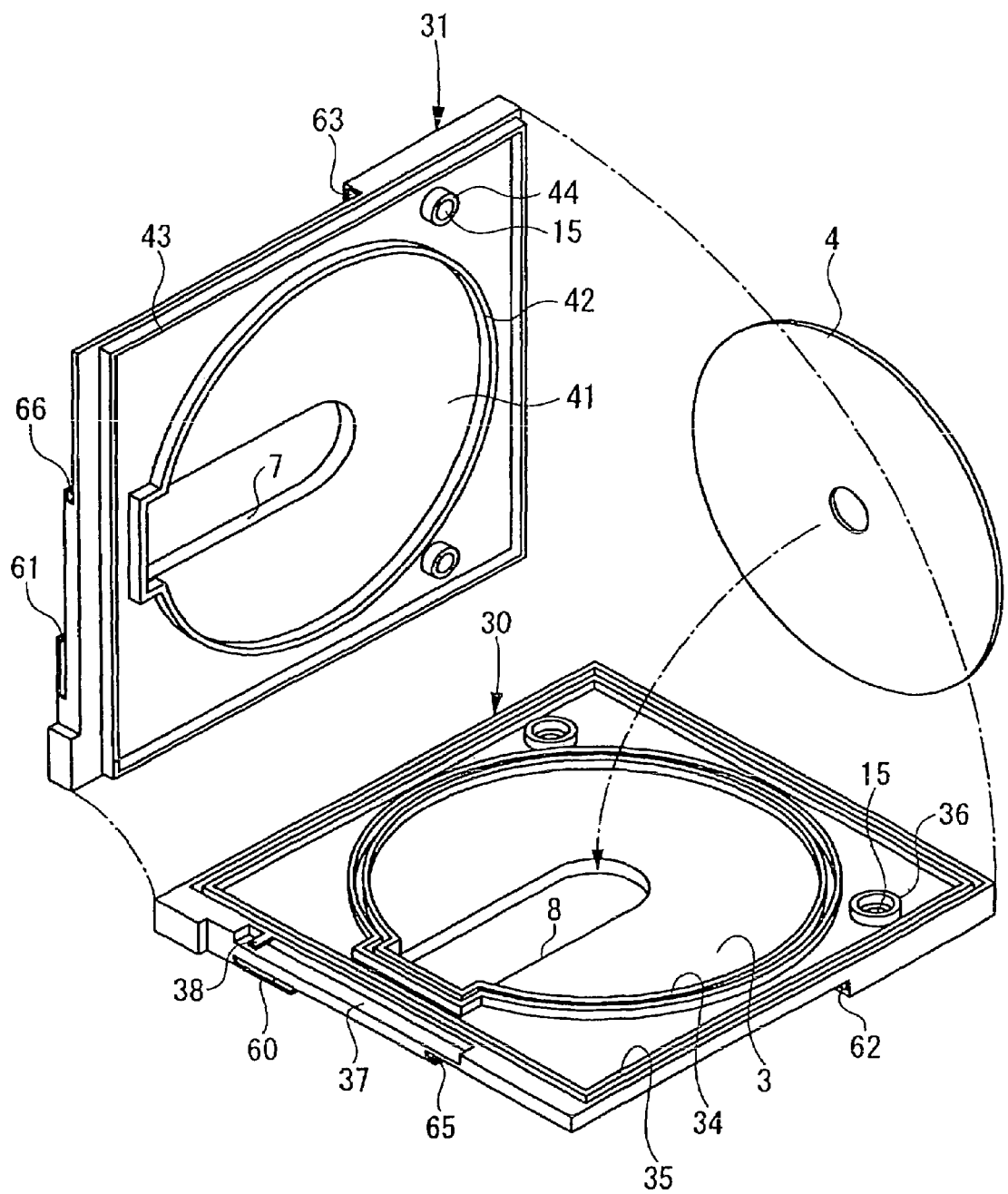
FIG. 7 is an exploded perspective view showing the configuration of the cartridge body.

As shown in FIG. 7, the cartridge body 25 includes a lower shell 30 substantially shaped like a plate, and an upper shell 31 connected to an upper surface of the lower shell 30. The lower and upper shells 30 and 31 are made of one and the same thermoplastic or similar thermoplastics to which a light-shield substance and a lubricant are added. Although this embodiment has been described on the case where the lower and upper shells 30 and 31 are used as first and second shells respectively, the lower and upper shells 30 and 31 may be reversed.

Various substances can be added as the light-shield substance. For example, it is preferable that 0.01% by weight to 5.00% by weight of various substances are added in accordance with the light-shield substance used. For example, carbon black can be used as the light-shield substance. The amount of carbon black to be added is preferably in a range of from 0.01% by weight to 2.00% by weight. Although a result is brought on improving light-shielding performance and physical strength when the amount of carbon black to be added is larger than 0.01% by weight, physical strength is lowered if the amount of carbon black to be added is larger than 2.00% by weight.

For example, a silicone-based lubricant can be used as the lubricant. Because friction resistance is reduced by addition of the silicone-based lubricant, generation of chips can be prevented from being caused by movement of the shutter 10. Moreover, generation of chips can be prevented from being caused by friction between the recording disc 4 and the inner wall of the cartridge 2 on impact during the transit. Moreover, handling property with respect to insertion into the apparatus is improved. In addition, because fluidity is improved, kneading characteristic at molding and processability at injection molding or the like are improved.

Incidentally, the amount of the silicone-based lubricant to be added is preferably in a range of from 0.1% by weight to 3.0% by weight. If the amount is not larger than 0.1% by weight, the effect is reduced. If the amount is not smaller than 3.0% by weight, fluidity is so excessive that a slip is generated between a screw and a resin at the time of kneading and molding. As a result, processability deteriorates, and the lubricant is bled out to a surface of a product and deposited on the recording disc 4, the user's hand or the like. This may cause disadvantages in handling property and external appearance. Incidentally, when copolymer silicone is used as the lubricant, the amount of the lubricant can be increased to 5.0% by weight because such disadvantages hardly occur.

A disc storage portion 3, a first recess 34, a second recess 35, light-shield walls 36 and a notch 37 are provided in an inner surface of the lower shell 30. The recording disc 4 is stored in the disc storage portion 3 substantially shaped like a circle. The first recess 34 is provided like protrusive stripes so as to surround the disc storage portion 3. The second recess 35 is provided in all the circumference of an end edge. The light-shield walls 36 surround the alignment holes 15 respectively. The notch 37 serves as a space for storing the spring of the shutter 10. A spring peg 38 is provided in the notch 37 so as to be integrated with the notch 37. An end of the spring of the shutter 10 is hung on the spring peg 38.

An upper surface portion 41, a first protrusion 42, a second protrusion 43 and light-shield walls 44 are provided in an inner surface of the upper shell 31. The upper surface portion 41 forms an upper surface of the disc storage portion 3 of the lower shell 30. The first protrusion 42 is inserted into the first recess 34 of the lower shell 30. The second protrusion 43 is inserted into the second recess 35. The light-shield walls 44 are provided so as to surround the alignment holes 15 respectively. The light-shield walls 44 are inserted into the light-shield walls 36 respectively.

Figure 8:
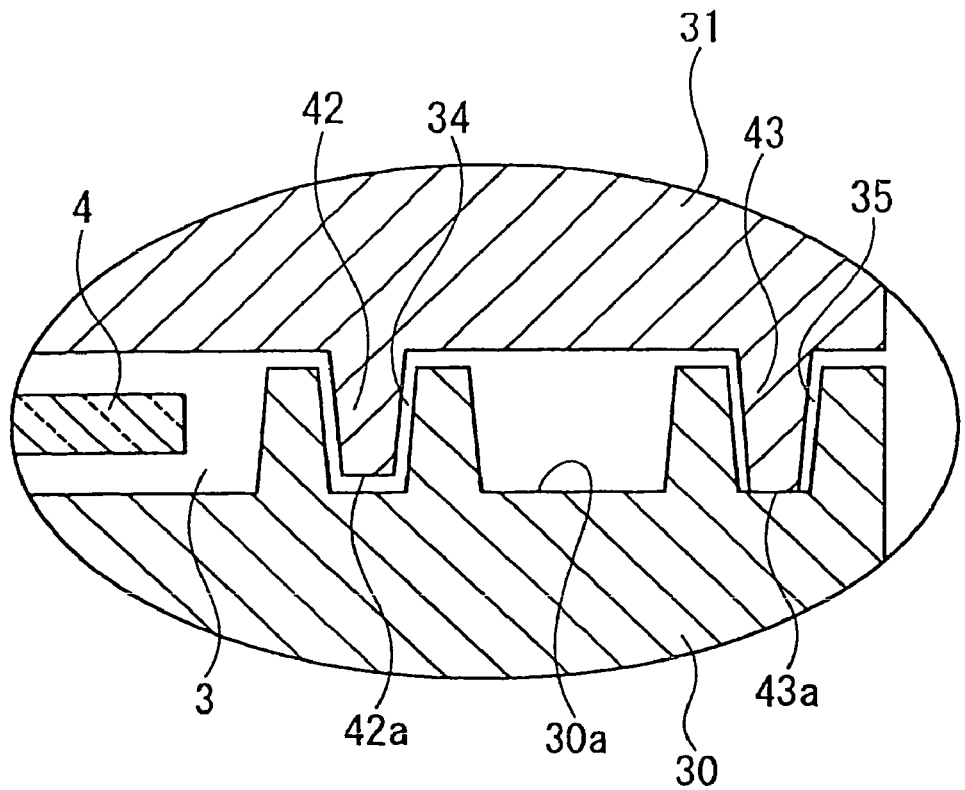
FIG. 8 is a sectional view showing a light-shielding structure constituted by protrusions and recesses.

When the recording disc 4 is put on the disc storage portion 3 and the upper shell 31 is put on the upper surface of the lower shell 30, the first protrusion 42 is fitted into the first recess 34. FIG. 8 is an enlarged view of the region indicated by the arrow D in FIG. 4. As shown in FIG. 8, a front end 42a of the first protrusion 42 fitted into the first recess 34 faces an inner surface 30a of the lower shell 30 while a front end 43a of the second protrusion 43 abuts on the inner surface 30a of the lower shell 30. In this manner, a fitting structure is formed.

Figure 9:
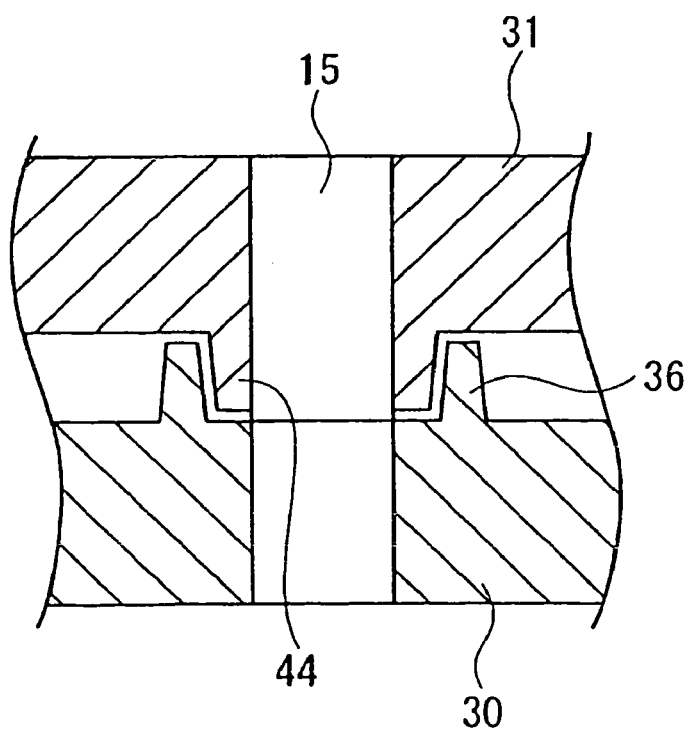
FIG. 9 is a sectional view showing a light-shielding structure of an alignment hole.

Because the outer circumference of the disc storage portion 3 is surrounded by a light-shielding structure shaped like a labyrinth, light or dust is prevented from entering the disc storage portion 3 through a mating surface between the lower shell 30 and the upper shell 31. As shown in FIG. 9 which is a sectional view, because the outer circumference of the alignment hole 15 is surrounded by a labyrinth-shaped light-shielding structure which is formed by fitting of the two light-shield walls 36 and 44, light or dust is prevented from entering the disc storage portion 3 through the alignment hole 15. Moreover, because the alignment hole 15 is disposed on the outside of the light-shielding structure formed by the first recess 34 and the first protrusion 42, there is no bad influence on light-shielding characteristic and dustproof characteristic of the disc storage portion 3.

The second protrusion 43 of the upper shell 31 is fixed to the inner surface 30a of the lower shell 30 by ultrasonic welding. Accordingly, the lower shell 30 and the upper shell 31 are bonded firmly, so that no gap is generated in the mating surface between the two shells 30 and 31. Although plastic dust may be scattered by ultrasonic welding, scattering can be minimized by ultrasonic welding in the second recess 35 to prevent the recording disc 4 from being polluted.

If the lower shell 30 and the upper shell 31 are ultrasonically welded to each other after the shutter 10, the lock mechanism 11, etc. are incorporated in the cartridge body 25, other components such as the shutter 10 may be welded together. To eliminate this problem, different type plastics from the lower and upper shells 30 and 31 can be preferably used as materials of other components such as the shutter 10.

Figure 10:
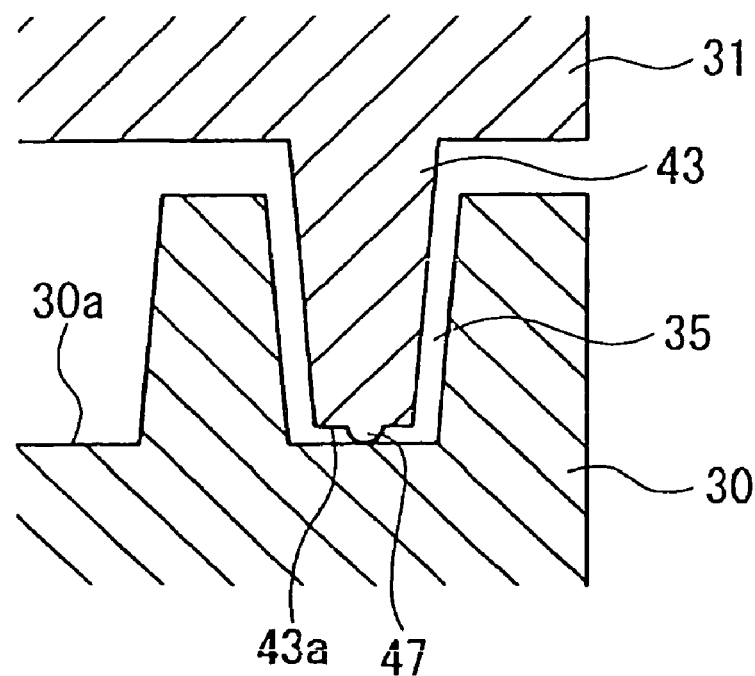
FIG. 10 is a sectional view of a light-shielding structure in which an energy director is provided.

As shown in FIG. 10, a protrusion-shaped energy director 47 may be provided at a front end 43a of the second protrusion 43 in order to more ensure bonding of the lower and upper shells 30 and 31 due to ultrasonic welding. When ultrasonic welding is performed in the condition that the energy director 47 is provided, the second protrusion 43 and the lower shell 30 can be welded to each other more firmly because ultrasonic energy is concentrated in the energy director 47. Incidentally, ultrasonic welding of the lower shell 30 and the upper shell 31 may be performed on the whole circumference of the second protrusion 43 or may be performed like a spot check at regular intervals.

Figure 11:
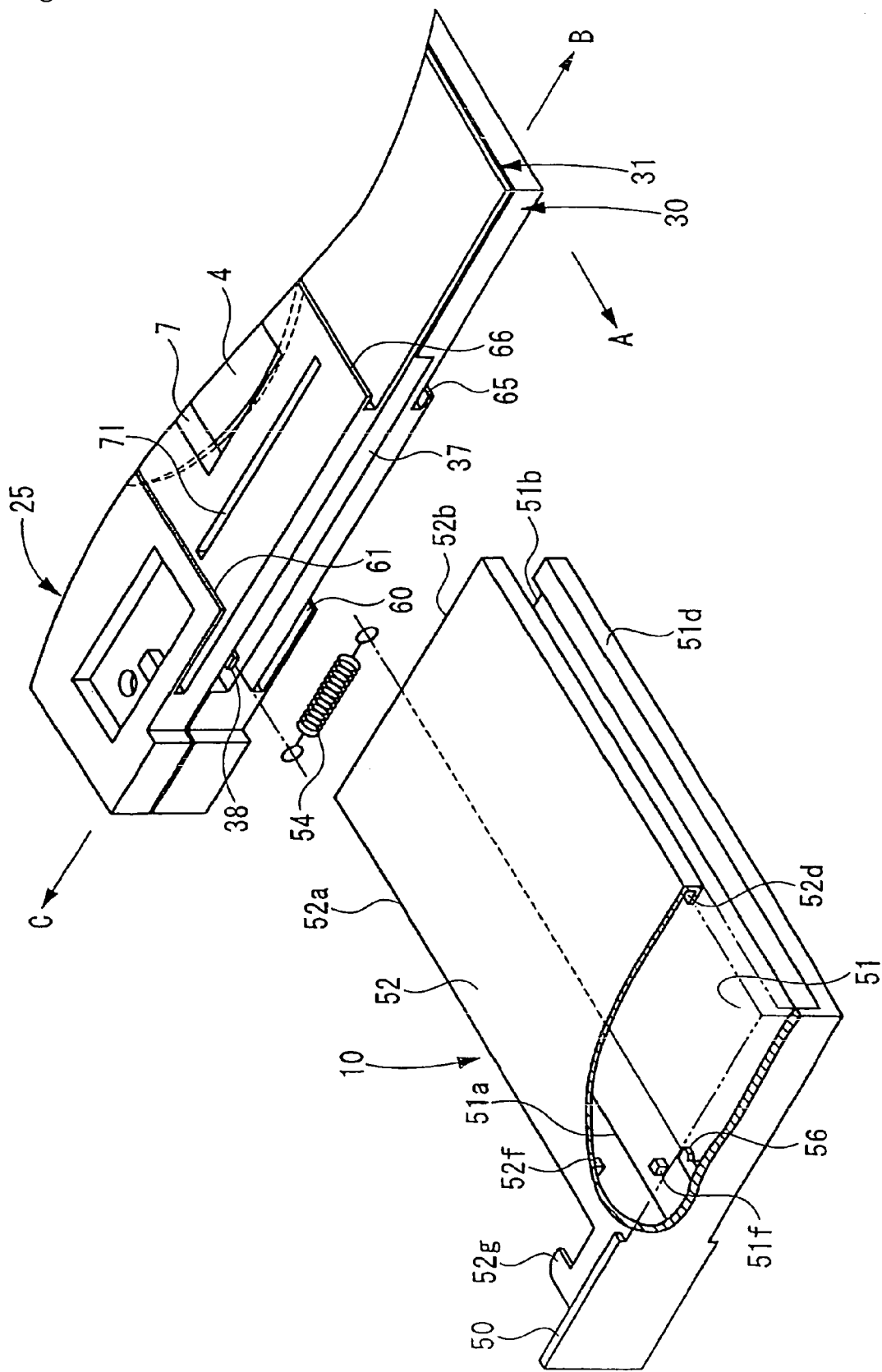
FIG. 11 is an exploded perspective view showing the configuration of the shutter.

The shutter 10 is made of a plastic different in kind from the lower and upper shells 30 and 31. A light-shield substance and a lubricant may be added to the plastic in the same manner as the plastic used for molding the lower and upper shells 30 and 31. As shown in FIG. 11, the shutter 10 includes a base portion 50, a lower shutter plate 51, and an upper shutter plate 52. The base portion 50 is disposed on a side surface of the cartridge body 25 in the mounting direction A. The lower shutter plate 51 and the upper shutter plate 52 are integrated with the base portion 50 so that upper and lower surfaces of the cartridge body 25 are put between the lower shutter plate 51 and the upper shutter plate 52. A spring peg 56 is provided in the inner surface of the base portion 50 so as to be integrated with the base portion 50. An end of a shutter spring 54 is hung on the spring peg 56. The other end of the shutter spring 54 is hung on the spring peg 38 of the lower shell 30 and stored in the notch portion 37 so that the shutter 10 is urged toward the close position.

Slits 60 and 61 and slits 62 and 63 (see FIGS. 1 and 2) are formed in outer surfaces of the lower and upper shells 30 and 31 respectively. Side end edges 51a and 52a of the shutter plates 51 and 52 in the closing direction C are received in the slits 60 and 61 respectively. Rear end edges 51b and 52b of the shutter plates 51 and 52 in the mounting direction A are received in the slits 62 and 63 respectively. First light-shield plate portions 51c and 52c, second light-shield plate portions 51d and 52d and third light-shield plate portions 51e and 52e are formed in the shutter plates 51 and 52 respectively. The first light-shield plate portions 51c and 52c slidably move to open/close the openings 7 and 8. The second light-shield plate portions 51d and 52d are provided vertically at front ends of the first light-shield plate portions 51c and 52c on a side of movement in the shutter-opening direction. The third light-shield plate portions 51e and 52e are provided vertically with respect to the second light-shield plate portions 51d and 52d in the direction of closing the shutter 10. A side end edge of each of the shutter plates 51 and 52 in the opening direction B serves as a bent portion substantially shaped like a U figure in sectional view in the opening/closing direction. Protrusions 31a are provided on outer surfaces of the lower and upper shells 30 and 31 so as to face the shutter plates 51 and 52 respectively. Protrusive lines 65 and 66 protruding out from the protrusions 31a are formed so that the protrusive lines 65 and 66 are inserted between the first light-shield plate portions 51c and 52c and the third light-shield plate portions 51e and 52e respectively when the shutter 10 is in the close position.

When the shutter 10 is in the close position, the end edges 51a, 51b, 52a and 52b of the shutter plates 51 and 52 are inserted into the slits 60, 62, 61 and 63 of the shells 30 and 31 respectively, so that the protrusive lines 65 and 66 provided in the shells 30 and 31 go between the first light-shield plate portions 51c and 52c and the third light-shield plate portions 51e and 52e in the shutter plates 51 and 52 respectively. As a result, the gap between the cartridge body 25 and the shutter 10 is also surrounded by a labylinth-shaped light-shielding structure, so that light or dust can be effectively prevented from entering through the gap between the cartridge body 25 and the shutter 10.

Guide protrusions 51f and 52f are formed on inner surfaces of the shutter plates 51 and 52 of the shutter 10. Guide grooves 70 and 71 (see FIG. 4) are formed in outer surfaces of the shells 30 and 31 so that the guide protrusions 51f and 52f are inserted in the guide grooves 70 and 71 respectively. When the shutter 10 moves on the outer surface of the cartridge body 25, the guide protrusions 51f and 52f move in the guide grooves 70 and 71 respectively. As a result, the shutter 10 can move smoothly without departing from the cartridge body 25. Incidentally, because a lubricant is added to a plastic as a raw material of each of the lower and upper shells 30 and 31 and the shutter 10, chips or the like are prevented from being generated due to friction at the time of moving the shutter 10.

Figure 12:
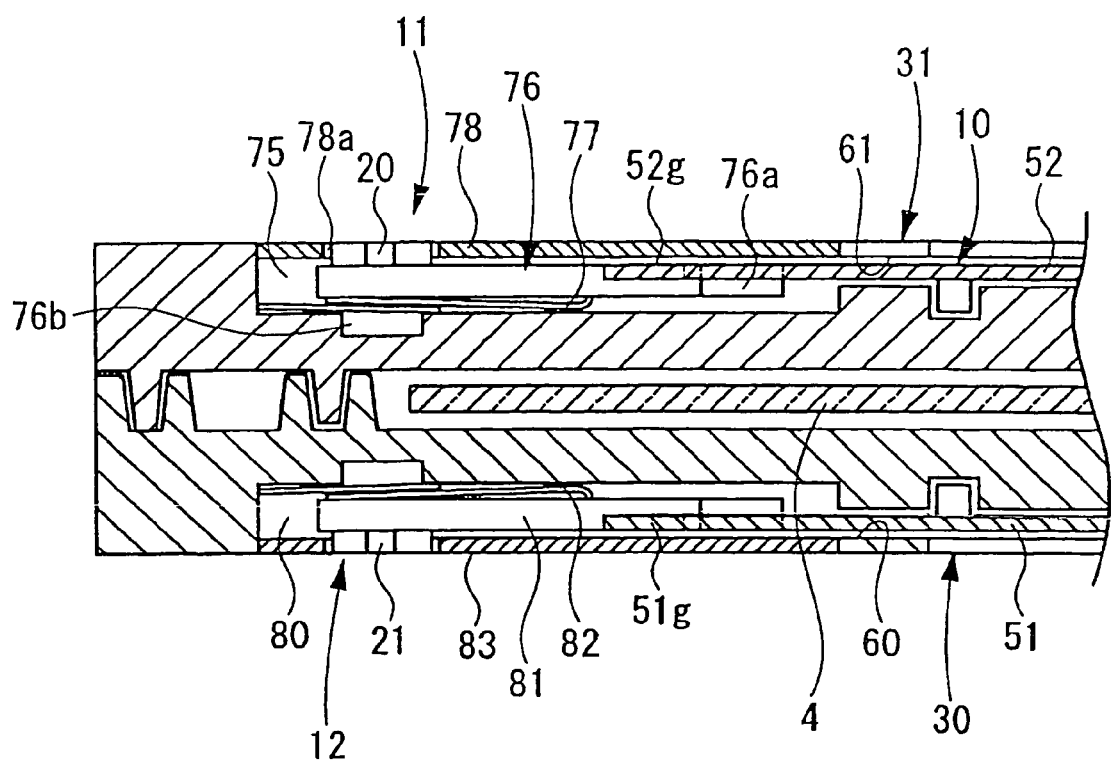
FIG. 12 is a sectional view of important part showing the configuration of a lock mechanism.

As shown in FIGS. 6 and 12, the lock mechanism 11 incorporated in the upper shell 31 includes a lock mechanism recess 75, a lock lever 76, a lock spring 77, and a lock cover 78. The lock mechanism recess 75 is formed in the outer surface of the upper shell 31 and connected to the slit 61. The lock lever 76 and the lock spring 77 are incorporated in the recess 75. The lock cover 78 is shaped like a plate for blocking the lock mechanism recess 75. The lock mechanism 11 locks the shutter 10 in the close position by engaging the lock lever 76 with an engagement claw 52g which is formed so as to be integrated with the upper shutter plate 52 of the shutter 10.

An engagement claw 76a, a shaft portion 76b and the trident unlock engagement portion 20 are integrally provided in the lock lever 76. The engagement claw 76a engages with the engagement claw 52g. The shaft portion 76b is inserted in a hole 75a formed in the lock mechanism recess 75 so that the shaft portion 76b can rotate. The lock spring 77 is made of a torsion spring. The lock spring 77 is inserted in the shaft portion 76b. An end of the lock spring 77 is hung on the lock lever 76. The other end of the lock spring 77 abuts on the inner wall surface of the lock mechanism recess 75. In this manner, the lock lever 76 is urged in a clockwise direction in FIG. 12. The unlock engagement portion 20 is exposed so as not to be protruded out from a hole 78a formed in the lock cover 78. The reference numeral 75b in the lock mechanism recess 75 designates a retention piece for catching the lock lever 76 urged by the lock spring 77 and retaining the lock lever 76 in an engagement position where the engagement claw 76a engages with the engagement claw 52g.

The lock mechanism 12 incorporated in the lower shell 30 includes a lock mechanism recess 80, a lock lever 81, a lock spring 82, and a lock lever 83. The lock mechanism recess 80 is formed in the outer surface of the lower shell 30 and connected to the slit 60. The lock lever 81 and the lock spring 82 are incorporated in the recess 80. The lock lever 83 is shaped like a plate for blocking the lock mechanism recess 80. The lock mechanism 12 locks the shutter 10 in the close position by engaging the lock lever 81 with the engagement claw 51g which is integrated with the lower shutter plate 51 of the shutter 10. Incidentally, detailed description of components of the lock lever 12 will be omitted because the components of the lock lever 12 are the same as those of the lock lever 11.

Figure 13A:
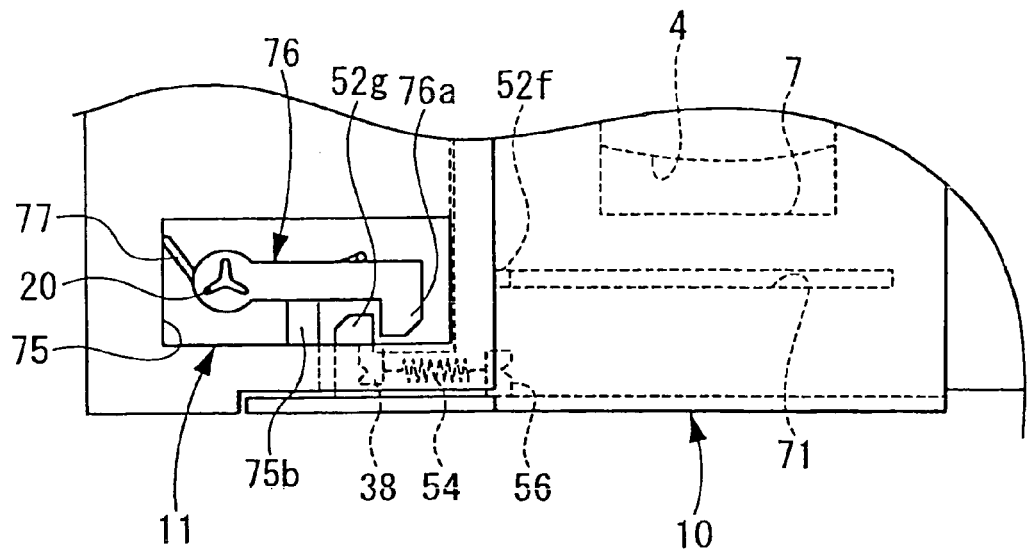
FIGS. 13A and 13B are views for explaining the operation of the lock mechanism.

FIG. 13A is a plan view showing a lock state of the lock mechanism 11. Incidentally, the lock state is shown in the condition that the lock cover 78 is removed in order to show the operation of the lock lever 76. As shown in FIGS. 1 and 5A, when the shutter 10 is in the close position, the engagement claw 76a urged by the lock spring 77 engages with the engagement claw 52g. As a result, the movement of the shutter 10 in the opening direction is limited so that the shutter 10 is prevented from being opened carelessly to expose the recording disc 4 to light.

Figure 13B:
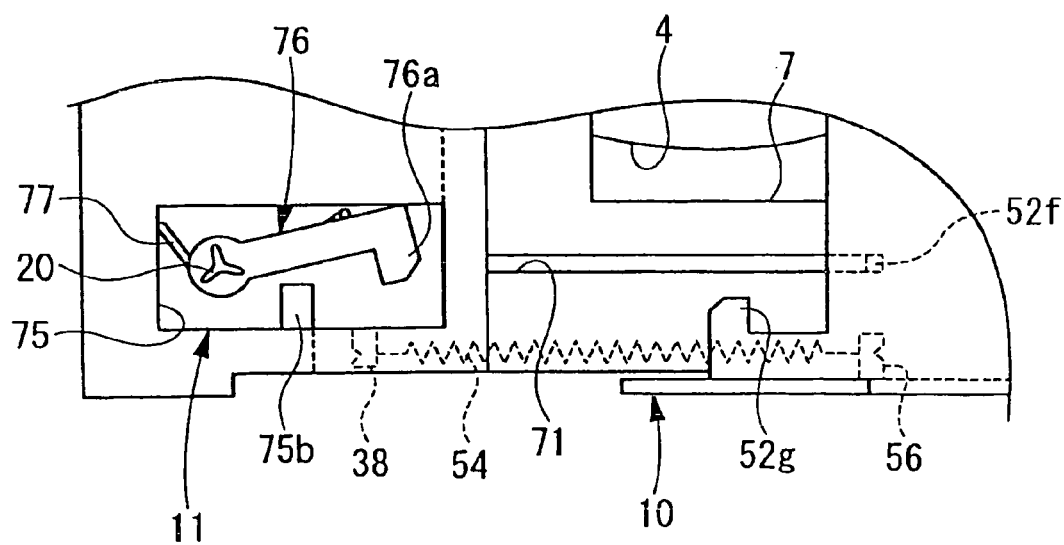

FIG. 13B shows an unlock state of the lock mechanism 11. As shown in FIG. 3, when the unlock engagement portion 20 is rotated counterclockwise in the unlocking direction by the unlock jig 18, the lock lever 76 is rotated counterclockwise against urging due to the lock spring 77. As a result, the engagement claw 76a is disengaged from the engagement claw 52g, so that the shutter 10 can move. Incidentally, because the shutter 10 is urged to the close position by the shutter spring 54, the shutter 10 is not opened by unlocking. As shown in FIGS. 3 and 5B, when the shutter 10 is moved to the open position, the openings 7 and 8 are opened so that the holographic recording layers of the recording disc 4 are revealed from the cartridge 2.

Though not shown in detail, the lock and unlock based on the lock mechanism 12 are performed in the same manner as the lock mechanism 11 and independent of the lock and unlock based on the lock mechanism 11. For this reason, the locks based on the lock mechanisms 11 and 12 on the upper and lower surfaces must be released simultaneously in order to release the lock of the shutter 10 in the close position. Accordingly, the risk that the shutter 10 will be opened by mistake when the cartridge 2 is singly in the outside can be reduced greatly.

Figure 14:
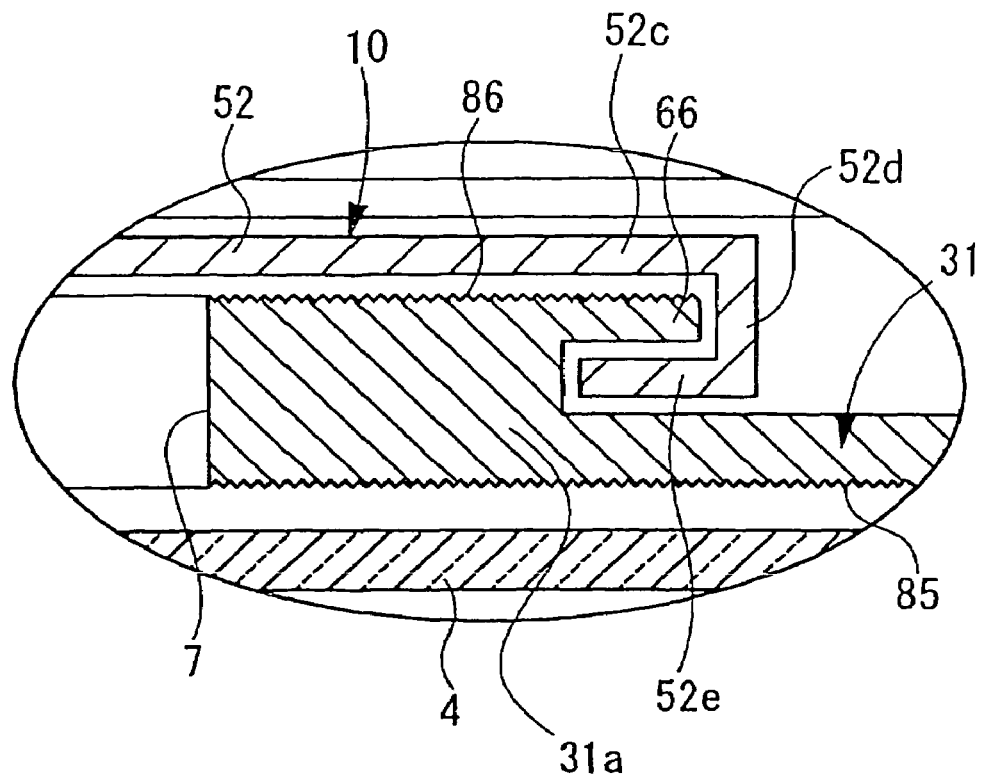
FIG. 14 is a sectional view of the upper shell in the first embodiment.
Figure 15:
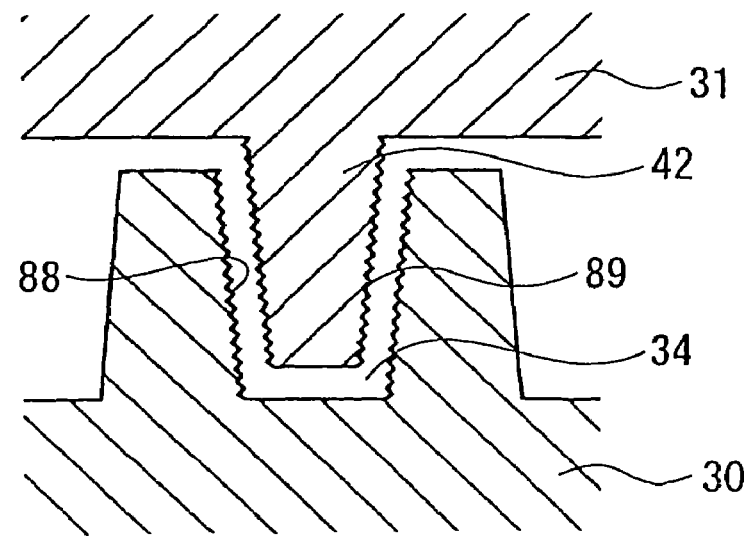
FIG. 15 is a sectional view showing rough surfaces provided in the protrusion and the recess.

FIG. 14 is an enlarged view of the region indicated by the arrow E in FIG. 5A. As shown in FIG. 14, rough surfaces 85 and 86 are formed in the inner surface of the upper shell 31 and the outer surface thereof facing the shutter 10. The rough surfaces 85 and 86 are provided for attenuating light entering in the cartridge 2 and between the cartridge body 25 and the shutter 10 to minimize the bad influence on the holographic recording layers of the recording disc 4. Though not shown in detail, the rough surfaces 85 and 86 are also provided in the lower shell 30. Moreover, the rough surface 86 facing the shutter 10 is also provided in the slits 60, 61, 62 and 63 of the lower and upper shells 30 and 31. In addition, as shown in FIG. 15, rough surfaces 88 and 89 may be provided in the inner surface of the first recess 34 of the lower shell 30 and in the outer surface of the first protrusion 42 of the upper shell 31 or rough surfaces may be provided in the inner surfaces of the shutter plates 51 and 52 of the shutter 10.

Figure 16:
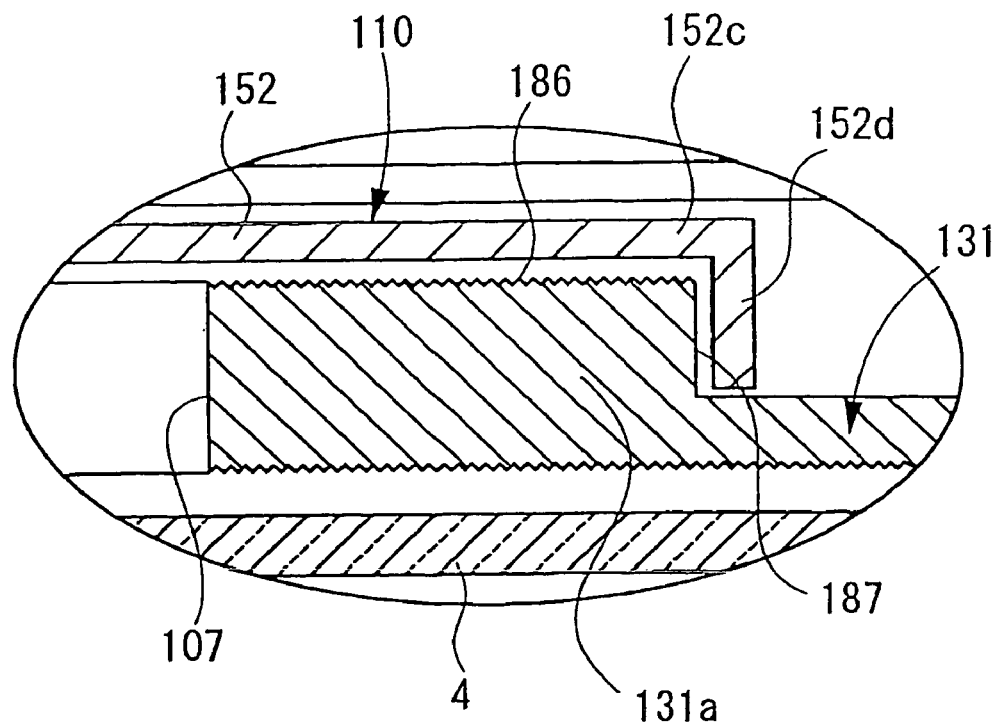
FIG. 16 is a sectional view of the upper shell in a second embodiment.

Next, a second embodiment of the holographic recording medium cartridge using the present invention will be described. Incidentally, in the following embodiment, members etc. having the same configuration and operation as those of the already described members etc. are referred to by the same or like numerals in the drawings, so that the description of the members will be simplified or omitted. FIG. 16 is an enlarged view of the region indicated by the arrow E in FIG. 5A, showing the second embodiment. A first light-shield plate portion 152c and a second light-shield plate portion 152d are formed in a shutter plate 152. The first light-shield plate portion 152c slidably moves to open/close an opening 107. The second light-shield plate portion 152d is provided vertically at a front end of the first light-shield plate portion 152c on a side where the first light-shield plate portion 152c moves in a direction of opening the shutter 110. A side end edge of each shutter plate 152 in the opening direction B serves as an L-shaped bent portion in sectional view in the opening/closing direction. A protrusion upper surface 186 and a protrusion side surface 187 are provided in a protrusion 131a provided on the outer surface of an upper shell 131. The protrusion upper surface 186 is formed so as to face the first light-shield plate portion 152c when the shutter 110 is in the close position. The protrusion side surface 187 is formed so as to face the second light-shield plate portion 152d when the shutter 110 is in the close position.

When the shutter 110 is in the close position, the protrusion upper surface 186 and the protrusion side surface 187 provided in each shell 131 face the first and second light-shield plate portions 152c and 152d respectively. As a result, the gap between the cartridge body 25 and the shutter 110 is also surrounded by a labyinth-shaped light-shielding structure, so that light or dust can be effectively prevented from entering through the gap between the cartridge body 25 and the shutter 110.

In the same manner as in the first embodiment, the protrusion upper surface 186 and the protrusion side surface 187 which are the inner surface of the upper shell 131 and the outer surface facing the shutter 110 may be rough surfaces. The protrusion upper surface 186 and the protrusion side surface 187 as rough surfaces are provided for attenuating light entering into the cartridge 2 and between the cartridge body 25 and the shutter 110 to minimize the bad influence on the holographic recording layers of the recording disc 4. Although the configuration of the upper shell 131 has been described with reference to FIG. 16, the configuration of the lower shell may be the same as that of the upper shell 131. For example, though not shown in detail, the protrusion upper surface 186 and the protrusion side surface 187 as rough surfaces are also provided in the lower shell.

Figure 17:
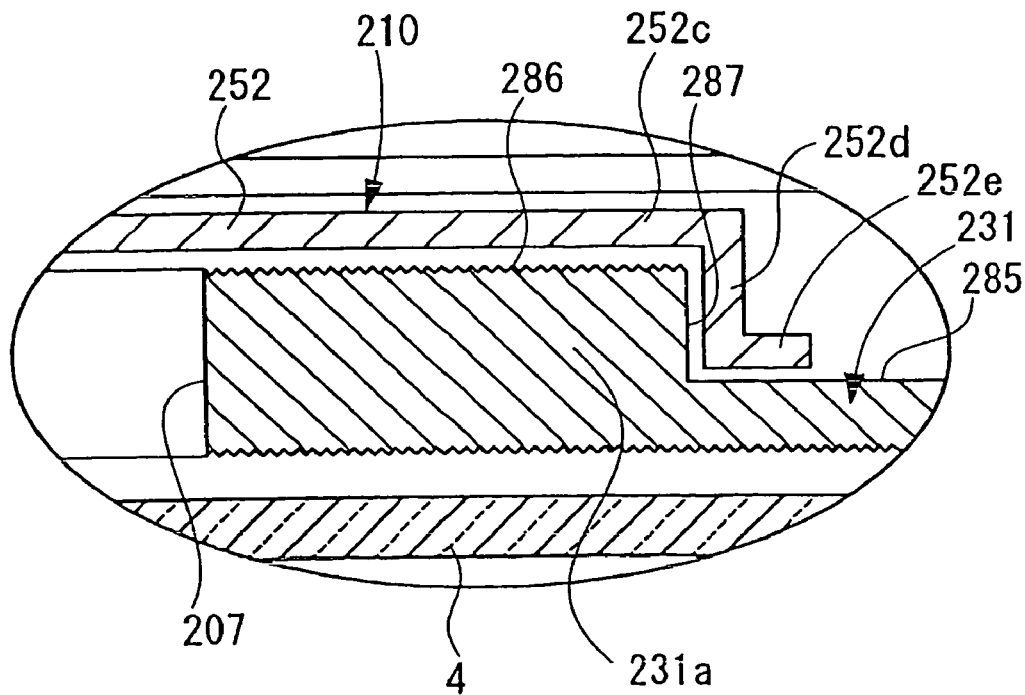
FIG. 17 is a sectional view of the upper shell in a third embodiment.

Next, a third embodiment of the holographic recording medium cartridge using the present invention will be described. FIG. 17 is an enlarged view of the region indicated by the arrow E in FIG. 5A, showing the third embodiment. A first light-shield plate portion 252c, a second light-shield plate portion 252d and a third light-shield plate portion 252e are formed in each shutter plate 252. The first light-shield plate portion 252c slidably moves to open/close an opening 207. The second light-shield plate portion 252d is provided vertically at a front end of the first light-shield plate portion 252c on a side where the first light-shield plate portion 252c moves in a direction of opening the shutter 210. The third light-shield plate portion 252e is provided vertically with respect to the second light-shield plate portion 252d in the direction of opening the shutter 210. A side end edge of each shutter plate 252 in the opening direction B serves as a step-wise bent portion in sectional view in the opening/closing direction. A protrusion upper surface 286, a protrusion side surface 287 and a shutter slide surface 285 are provided in a protrusion 231a provided on the outer surface of an upper shell 231. The protrusion upper surface 286 is formed so as to face the first light-shield plate portion 252c when the shutter 210 is in the close position. The protrusion side surface 287 is formed so as to face the second light-shield plate portion 252d when the shutter 210 is in the close position. The shutter slide surface 285 is offset in the inside of the protrusion upper surface 286 and formed so as to face the third light-shield plate portion 252e when the shutter 210 is in the close position.

When the shutter 210 is in the close position, the protrusion upper surface 286, the protrusion side surface 287 and the shutter slide surface 285 provided in the upper shell 231 face the first, second and third light-shield plate portions 252c, 252d and 252e respectively. As a result, the gap between the cartridge body 225 and the shutter 210 is also surrounded by a labylinth-shaped light-shielding structure, so that light or dust can be effectively prevented from entering through the gap between the cartridge body 225 and the shutter 210.

In the same manner as in the first embodiment, the protrusion upper surface 286, the protrusion side surface 287 and the shutter slide surface 285 which are the inner surface of the upper shell 231 and the outer surface facing the shutter 210 may be rough surfaces. The protrusion upper surface 286, the protrusion side surface 287 and the shutter slide surface 285 as rough surfaces are provided for attenuating light entering into the cartridge 2 and between the cartridge body 225 and the shutter 210 to minimize the bad influence on the holographic recording layers of the recording disc 4. Though not shown in detail, the protrusion upper surface 286, the protrusion side surface 287 and the shutter slide surface 285 as rough surfaces are also provided in the lower shell.

EXAMPLES

An example of the invention will be described below.

PBT, ABS, POM, PS, PP, HDPE, PA, PET, PPS, SAN (styrene-acrylonitrile copolymer), PMMA, PC, etc. may be used as the thermoplastic compound used for molding the upper shell and the lower shell. With respect to other components than the upper shell and the lower shell, a material different from the material used for the upper shell and the lower shell may be selected from the thermoplastic compounds in order to prevent mistaken welding due to ultrasonic welding.

It is preferable that a plastic having light-shielding characteristic exhibiting visible light transmittance of not higher than 1.0% at a thickness of 0.2 mm is used for the upper shell and the lower shell, and that the thickness of each shell is selected to be in a range of from 0.2 to 1.6 mm in order to obtain necessary physical strength. To obtain the plastic having such light-shielding characteristic, a light-shield substance may be added. Various materials can be used as the light-shield substance. It is preferable that 0.01% by weight to 5.00% by weight of a light-shield substance are added in accordance with the light-shield substance used. Examples of the light-shield substance are as follows.

(1) Inorganic Compound

A. Oxide . . . silica, diatomaceous earth, alumina, titanium oxide, iron oxide (iron black), zinc oxide, magnesium oxide, antimony oxide, barium ferrite, strontium ferrite, beryllium oxide, pumice, pumice balloon, alumina fiber, etc.

B. Hydroxide . . . aluminum hydroxide, magnesium hydroxide, basic magnesium carbonate, etc.

C. carbonate . . . calcium carbonate, magnesium carbonate, dolomite, dawsonite, etc.

D. sulfate, sulfite . . . calcium sulfate, barium sulfate, ammonium sulfate, calcium sulfite, etc.

E. silicate . . . talc, clay, mica, asbestos, glass fiber, glass balloon, glass beads, calcium silicate, montmorillonite, bentonite, etc.

F. carbon . . . carbon black, graphite, carbon fiber, carbon hollow sphere, etc.

G. others . . . iron powder, copper powder, lead powder, aluminum powder, molybdenum sulfide, polonium fiber, silicon carbide fiber, brass fiber, potassium titanate, lead titanate zirconate, zinc borate, barium metaborate, calcium borate, sodium borate, aluminum paste, talc, etc.

(2) Organic Compound

Wood flour (pine, oak, saw-dust, etc.), chaff fiber (almond, peanut, rice hulls, etc.), cotton, jute, paper spline, non-wood fiber (straw, Kenaf, bamboo, esparto, bagasse, Jew's mallow, firework, etc.), cellophane piece, Nylon fiber, polypropylene fiber, starch (inclusive of denatured starch and surface-treated starch), aromatic polyamide fiber, etc.

Among these light-shield substances, inorganic compounds which little exert a bad influence on photographic characteristic, which are stable to heat of 150° C. or higher and which are opacified are preferred. Light-absorbent carbon black, titanium nitride, graphite and iron black which are substances excellent in heat resistance and light resistance and relatively inactive are especially preferred.

When carbon black is used as the light-shield substance, the amount of carbon black to be added is preferably selected to be in a range of from 0.01% by weight to 2.00% by weight. As described above, the purpose is to obtain a plastic good in the balance of light-shielding characteristic and physical strength.

Examples of classification of raw materials of carbon black include gas black, furnace black, channel black, anthracene black, acetylene black, ketjen carbon black, thermal black, lamp black, oil soot, pine oil soot, animal black, vegetable black, etc.

Typical examples of preferred carbon black available on the market include carbon black #20 (B), #30 (B), #33 (B),

40 (B), #41 (B), #44 (B), #45 (B), #50, #55, #100, #600, #950, #1000, #2000 (B), #2400 (B), MA8, MA100, etc. made by Mitsubishi Chemical Corporation. Various grades of Denka black made by DENKI KAGAKU KOGYO KABUSHIKI KAISHA, Seast made by TOKAI Carbon Co., Ltd., Asahi #78 made by Asahi Carbon Co., Ltd., Showa black made by Showa Cabot K.K, Niteron made by Nippon Steel Chemical Carbon Co., Ltd., Diamond black made by Mitsubishi Chemical Corp., etc. may be also used.

Examples of overseas products include Black Pearls 2, 46, 70, 71, 74, 80, 81, 607, etc., Regal 1300, 330, 400, 660, 991, SRF-S, etc., Vulcan 3, 6, etc., Stearling 10, SO, V, S, FT-FF, MT-FF, etc. made by Cabot Corp.

In addition, examples include United R, BB, 15, 102, 3001, 3004, 3006, 3007, 3008, 3009, 3011, 3012, XC-3016, XC-3017, 3020, etc. made by Ashland Specialty Chemical Company. The invention is not limited thereto.

A silicone-based lubricant can be used as the lubricant added to the upper shell, the lower shell and the shutter. Especially, various grades of dimethyl polysiloxane may be used. Various grades of dimethyl polysiloxane available on the market and made by TORAY Industries, Inc., Dow Corning, Silicone, GE Toshiba Silicone Co., Ltd., Wacker Asahikasei Silicone Co., Ltd., Shin-Etsu Chemical Co., Ltd., etc. can be used. Incidentally, either master batch or kneaded article can be used. Incidentally, the amount of the silicone-based lubricant to be added is preferably selected to be in a range of from 0.1% by weight to 5.0% by weight. As described above, the purpose is to obtain a plastic good in balance of friction resistance, product quality and product optimization.

If the surface roughness Ra of the rough surface provided in each shell is not larger than 5 μm, the light-diffusing effect is small. If the surface roughness Ra is not smaller than 20 μm, there is a possibility that the surface of contact with the recording disc will be scratched. For this reason, the surface is preferably matted or embossed with a surface roughness Ra of from 5 to 20 μm.

Although ultrasonic welding is used for fixing the upper and lower shells to each other, other welding and fixing methods may be used. For example, in the case of fixing using screws or the like, it is preferable that a light-shielding structure is formed around each screw hole.

Although description has been made on the case where a cartridge for storing a double-side recordable recording disc is taken as an example, the cartridge may be formed for storing a single-side recordable recording disc. In this case, an opening is formed only in one surface so that the opening can be opened/closed by a shutter. Although description has been made on the case where a cartridge for storing a holographic recording medium is taken as an example, the invention can be applied also to a cartridge for storing a recording medium having other photosensitive characteristic.

In the cartridge according to the invention, the bent portion of the shutter is not limited to an end portion on a side of movement in the shutter-opening direction if a labyrinth structure can be formed between the outer circumferential end portion of the shutter and the bent portion of the cartridge body. The bent portion may be provided in any region of the outer circumferential end portion of the shutter. For example, as shown in FIG. 11, bent portions may be formed at rear end edges 51*b* and 52*b* of shutter plates 51 and 52 while protrusions on the cartridge body side are formed in positions corresponding to the bent portions of the rear end edges 51*b* and 52*b*.

This application is based on Japanese Patent application JP 2005-238706, filed Aug. 19, 2005, the entire content of which is hereby incorporated by reference, the same as if set forth at length.

What is claimed is:

1. A photosensitive recording medium cartridge comprising a cartridge body, an opening, and a shutter, the cartridge body receiving a disc type photosensitive recording medium therein so that the photosensitive recording medium can rotate, the opening being provided in the cartridge body for exposing the photosensitive recording medium to an outside, the shutter being attached to the cartridge body so that the shutter can move between a close position for closing the opening and an open position for opening the opening, wherein:

the shutter includes a bent portion which is formed in an outer circumferential end portion of the shutter so as to be bent toward the cartridge body side;

the cartridge body includes a protrusion portion which is formed in a position corresponding to the outer circumferential end portion;

the bent portion is formed in an end portion on a side of the outer circumferential end portion which can move in a direction of opening the shutter;

the shutter includes a first light-shield plate portion slidably moving so as to open/close the opening, a second light-shield plate portion provided vertically at an end on a side of the first light-shield plate portion which can move in a direction of opening the shutter, and a third light-shield plate portion provided vertically in a direction of closing the shutter with respect to the second light-shield plate portion; and the cartridge body includes a protrusive line which is inserted between the first light-shield plate portion and the third light-shield plate portion when the shutter is in the close position.

2. The photosensitive recording medium cartridge according to claim 1, wherein the cartridge body is formed so that an inner surface of the cartridge body to the photosensitive recording medium and an outer surface of the cartridge body to the shutter are matted or embossed with a surface roughness Ra of 5 to 20 μm.

3. The photosensitive recording medium cartridge according to claim 1, wherein the cartridge body includes a first shell substantially shaped like a plate, and a second shell lap-welded with the first shell, the first and second shells being made of a thermo plastic, the other components inclusive of the shutter being made of materials different from the materials of the first and second shells.

4. The photosensitive recording medium cartridge according to claim 3, wherein 0.01% by weight to 5.00% by weight of a light-shield substance are added to a plastic used for molding each of the first and second shells and the shutter.

5. The photosensitive recording medium cartridge according to claim 3, wherein 0.01% by weight to 2.00% by weight of carbon black are added to a plastic used for molding each of the first and second shells and the shutter.

6. The photosensitive recording medium cartridge according to claim 3, wherein 0.1% by weight to 5.0% by weight of a silicone-based lubricant are added to a plastic used for molding each of the first and second shells and the shutter.

7. The photosensitive recording medium cartridge according to claim 1, wherein the photosensitive recording medium is a holographic recording medium.

8. A photosensitive recording medium cartridge comprising a cartridge body, an opening, and a shutter, the cartridge body receiving a disc type photosensitive recording medium therein so that the photosensitive recording medium can rotate, the opening being provided in the cartridge body for exposing the photosensitive recording medium to an outside, the shutter being attached to the cartridge body so that the shutter can move between a close position for closing the opening and an open position for opening the opening, wherein:

the shutter includes a bent portion which is formed in an outer circumferential end portion of the shutter so as to be bent toward the cartridge body side;

the cartridge body includes a protrusion portion which is formed in a position corresponding to the outer circumferential end portion;

the shutter includes a first light-shield plate portion slidably moving so as to open/close the opening, a second light-shield plate portion provided vertically at an end on a side of the first light-shield plate portion which can move in a direction of opening the shutter, and a third light-shield plate portion provided vertically with respect to the second light-shield plate portion in a direction of opening the shutter; and the cartridge body includes a protrusion portion upper surface formed so as to face the first light-shield plate portion when the shutter is in the close position, a protrusion portion side surface formed so as to face the second light-shield plate portion when the shutter is in the close position, and a shutter slide surface offset in the inside of the protrusion portion upper surface and formed so as to face the third light-shield plate portion when the shutter is in the close position.

9. The photosensitive recording medium cartridge according to claim 8, wherein the cartridge body is formed so that an inner surface of the cartridge body to the photosensitive recording medium and an outer surface of the cartridge body to the shutter are matted or embossed with a surface roughness Ra of 5 to 20 μm.

10. The photosensitive recording medium cartridge according to claim 8, wherein the cartridge body includes a first shell substantially shaped like a plate, and a second shell lap-welded with the first shell, the first and second shells being made of a thermo plastic, the other components inclusive of the shutter being made of materials different from the materials of the first and second shells.

11. The photosensitive recording medium cartridge according to claim 10, wherein 0.01% by weight to 5.00% by weight of a light-shield substance are added to a plastic used for molding each of the first and second shells and the shutter.

12. The photosensitive recording medium cartridge according to claim 10, wherein 0.01% by weight to 2.00% by weight of carbon black are added to a plastic used for molding each of the first and second shells and the shutter.

13. The photosensitive recording medium cartridge according to claim 10, wherein 0.1% by weight to 5.0% by weight of a silicone-based lubricant are added to a plastic used for molding each of the first and second shells and the shutter.

14. The photosensitive recording medium cartridge according to claim 8, wherein the photosensitive recording medium is a holographic recording medium.

* * * * *